US012766794B2

(12) United States Patent
Longtine et al.

(10) Patent No.: US 12,766,794 B2
(45) Date of Patent: Oct. 20, 2026

(54) FRANGIBLE FUSED DEPOSITION MODELING ADDITIVE MANUFACTURING ANCHOR STANCHION

(71) Applicant: GM Global Technology Operations LLC, Detroit, MI (US)

(72) Inventors: Jerome Longtine, Marine City, MI (US); Benjamin John LeBlanc, Ortonville, MI (US); Mitchell Patterson, Richmond, MI (US); Zachary Paul Steffes, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 211 days.

(21) Appl. No.: 18/631,584

(22) Filed: Apr. 10, 2024

(65) Prior Publication Data

US 2025/0319664 A1 Oct. 16, 2025

(51) Int. Cl.

| | |
|---|---|
| ***B29C 64/40*** | (2017.01) |
| ***B29C 64/118*** | (2017.01) |
| ***B33Y 10/00*** | (2015.01) |
| ***B33Y 80/00*** | (2015.01) |

(52) U.S. Cl.

CPC ............ *B29C 64/40* (2017.08); *B29C 64/118* (2017.08); *B33Y 10/00* (2014.12); *B33Y 80/00* (2014.12)

(58) Field of Classification Search

CPC ........ B22F 10/18; B22F 10/47; B29C 64/118; B29C 64/40; B33Y 10/00; B33Y 80/00

See application file for complete search history.

(56) References Cited

U.S. PATENT DOCUMENTS 11,279,122 B2 3/2022 Herman et al.

FOREIGN PATENT DOCUMENTS

DE 112017004044 T5 5/2019

OTHER PUBLICATIONS

DE Office Action for Appln No. 10 2024 112 755.4 dated Sep. 25, 2024, 4 pages.

*Primary Examiner* — Lawrence D Ferguson

(74) *Attorney, Agent, or Firm* — CANTOR COLBURN LLP

(57) ABSTRACT

A fused deposition modeling (FDM) additively manufactured part system includes a support substrate and a part portion arranged at the support substrate. The part portion includes a plurality of part layers having a part layer diameter. The part portion includes a downwardly facing surface and a side surface. A stanchion portion including a plurality of stanchion layers having a stanchion layer diameter supports the part portion relative to the support substrate. The stanchion portion being frangibly connected to the side surface of the part portion. A first portion of the plurality of stanchion layers solely form a segment of the stanchion portion and a second portion of the plurality of stanchion layers overlap onto a first part layer of the plurality of part layers forming the side surface.

20 Claims, 4 Drawing Sheets

FRANGIBLE FUSED DEPOSITION MODELING ADDITIVE MANUFACTURING ANCHOR STANCHION

INTRODUCTION

The subject disclosure relates to the art of additively manufactured parts and, more particularly, to a frangible fused deposition modeling (FDM) additively manufactured anchor stanchion.

Many parts, particularly at the research and development (R&D) or testing stage are additively manufactured. One form of additive manufacturing, fused deposition modeling (FDM) additive manufacturing, is often used for such purposes. FDM is a process that uses a continuous filament of material to form a part. The filament of material is fed from a large spool through a heated printer head and deposited on a substrate. Layers of the filament are built up to form the part. In addition to building the part, additional layers are deposited to form stanchions that support the part on a base substrate. The stanchions are later removed.

Given the current nature of the FDM process, (i.e., depositing material in layers), stanchions are connected to downwardly facing planer surfaces. Often times this creates limitations on article orientation and formation. Further, as the stanchions are formed along with the part, it is often times difficult to distinguish between part and stanchion. This makes separating the stanchion from the part a difficult, time consuming and thus expensive process. In some cases, the underlying part is damaged when the stanchion is removed. Accordingly, it is desirable to create a stanchion that may attach to various surfaces of the part and, at the same time, be easy to detach.

SUMMARY

A fused deposition modeling (FDM) additively manufactured part system, in accordance with a non-limiting example, includes a support substrate and a part portion arranged at the support substrate. The part portion includes a plurality of part layers having a part layer diameter. The part portion includes a downwardly facing surface and a side surface. A stanchion portion including a plurality of stanchion layers having a stanchion layer diameter supports the part portion relative to the support substrate. The stanchion portion being frangibly connected to the side surface of the part portion. A first portion of the plurality of stanchion layers solely form a segment of the stanchion portion and a second portion of the plurality of stanchion layers overlap onto a first part layer of the plurality of part layers forming the side surface.

In addition to one or more of the features described herein the second portion of the plurality of stanchion layers comprises a single one of the second portion of the plurality of stanchion layers.

In addition to one or more of the features described herein the single one of the second portion of the plurality of stanchion layers is horizontally aligned with a second part layer of the plurality of part layers.

In addition to one or more of the features described herein the single one of the second portion of the plurality of stanchion layers that overlaps onto the first part layer of the plurality of part layers and the second part layer of the plurality of part layers form a continuous shared layer.

In addition to one or more of the features described herein a first plurality of the plurality of part layers is arranged between the support substrate and the single one of the second portion of the plurality of stanchion layers.

In addition to one or more of the features described herein a second plurality of the plurality of part layers is arranged on the second part layer of the plurality of part layers.

In addition to one or more of the features described herein a plurality of the first portion of the plurality of stanchion layers is horizontally aligned with and spaced from a corresponding plurality of the second plurality of the plurality of part layers.

In addition to one or more of the features described herein the plurality of the first portion of the plurality of stanchion layers includes an outer tapered surface and the second plurality of the plurality of part layers includes a tapered surface portion.

In addition to one or more of the features described herein the outer tapered surface of one of the first portion of the plurality of stanchion layers is horizontally spaced from the tapered surface portion of one of the second plurality of the plurality of part layers.

In addition to one or more of the features described herein the outer tapered surface of one of the first portion of the plurality of stanchion layers and the tapered surface portion of one of the second plurality of part layers form an interface having a diameter that is less than the stanchion layer dimeter and the part layer diameter.

A method of forming a fused deposition modeling (FDM) additively manufactured part system, in accordance with a non-limiting example, includes depositing a first portion of a plurality of stanchion layers onto a support substrate, forming a plurality of part layers adjacent to the first portion of the plurality of stanchion layers, and forming a second portion of the plurality of stanchion layers on the first portion of the plurality of stanchion layers, at least one of the second portion of the plurality of stanchion layers overlapping one of the plurality of part layers.

In addition to one or more of the features described herein forming the second portion of the plurality of stanchion layers includes overlapping a single one of the second portion of the plurality of stanchion layers onto the one of the plurality of part layers.

In addition to one or more of the features described herein overlapping the single one of the second portion of the plurality of stanchion layers includes horizontally aligning the single one of the second portion of the plurality of stanchion layers with one of the plurality of part layers.

In addition to one or more of the features described herein horizontally aligning the single one of the second portion of the plurality of stanchion layers with one of the plurality of part layers includes forming a continuous layer that is shared by the plurality of stanchion layers and the plurality of part layers.

In addition to one or more of the features described herein the method further includes forming additional ones of the plurality of part layers on the continuous layer.

In addition to one or more of the features described herein, the method further includes depositing additional ones of the first portion of the plurality of stanchion layers on the continuous layer.

In addition to one or more of the features described herein depositing the additional ones of the first portion of the plurality of stanchion layers includes horizontally aligning the additional ones of the first portion of the plurality of stanchion layers with the additional ones of the plurality of part layers.

In addition to one or more of the features described herein horizontally aligning the additional ones of the first portion of the plurality of stanchion layers with the additional ones of the plurality of part layers includes maintaining a gap between the additional ones of the first portion of the plurality of stanchion layers and the additional ones of the plurality of part layers.

In addition to one or more of the features described herein horizontally aligning the single one of the second portion of the plurality of stanchion layers with one of the plurality of part layers includes forming a bond between the single one of the second portion of the plurality of stanchion layers and the one of the plurality of part layers.

In addition to one or more of the features described herein forming the bond includes creating a connection having a diameter that is less than a diameter of the single one of the second portion of the plurality of stanchion layers and the one of the plurality of part layers.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
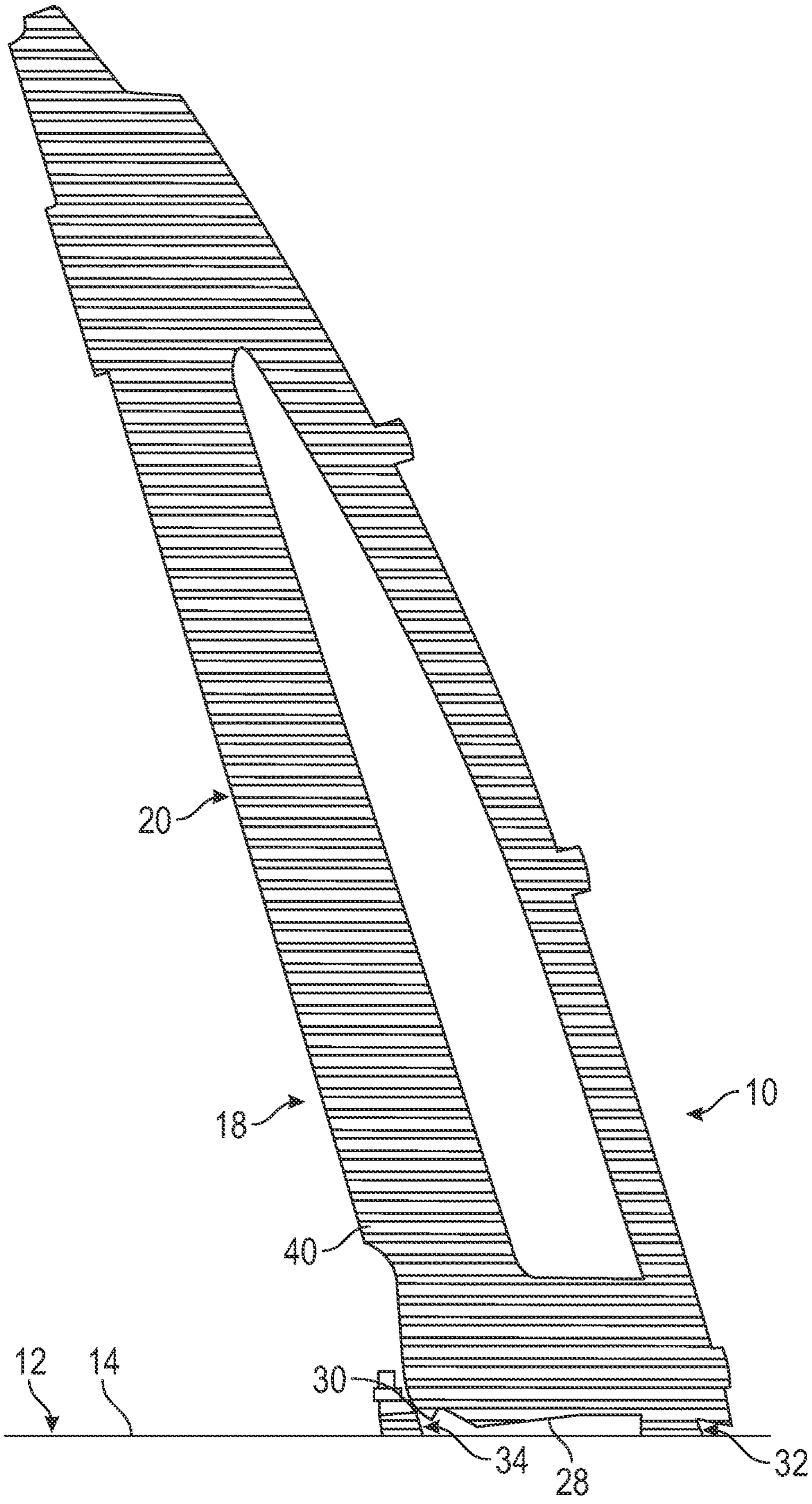
FIG. 1 is an elevational view of a fused deposition modeling (FDM) additively manufactured part system, including an anchor stanchion, in accordance with a non-limiting example.

The following description is merely exemplary in nature and is not intended to limit the present disclosure, its application or uses. It should be understood that throughout the drawings, corresponding reference numerals indicate like or corresponding parts and features.

A fused deposition modeling (FDM) additively manufactured (AM) part system, in accordance with a non-limiting example, is indicated generally at 10 in FIG. 1. FDM AM part system 10 includes a support substrate 12 having a substantially planar surface 14 upon which is constructed or formed an FDM AM part portion 18. FDM AM part portion 18 may take the form of a door panel 20 or any other component that may be formed through an FDM AM process. FDM AM part portion 18 includes a downwardly facing surface 28 and a side surface 30. In a non-limiting example, FDM MA part portion 18 is connected to support substrate 12 through a first stanchion portion 32 connected to downwardly facing surface 28 and a second stanchion portion 34 connected to side surface 30.

Figure 2:
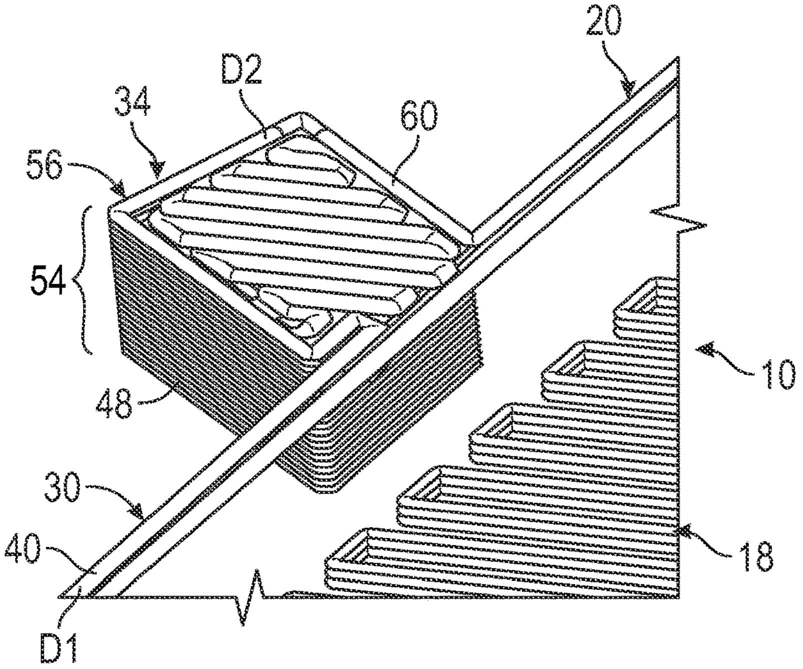
FIG. 2 is a perspective view of the anchor stanchion being formed with a side surface of an FDM additively manufactured part, in accordance with a non-limiting example.
Figure 3:
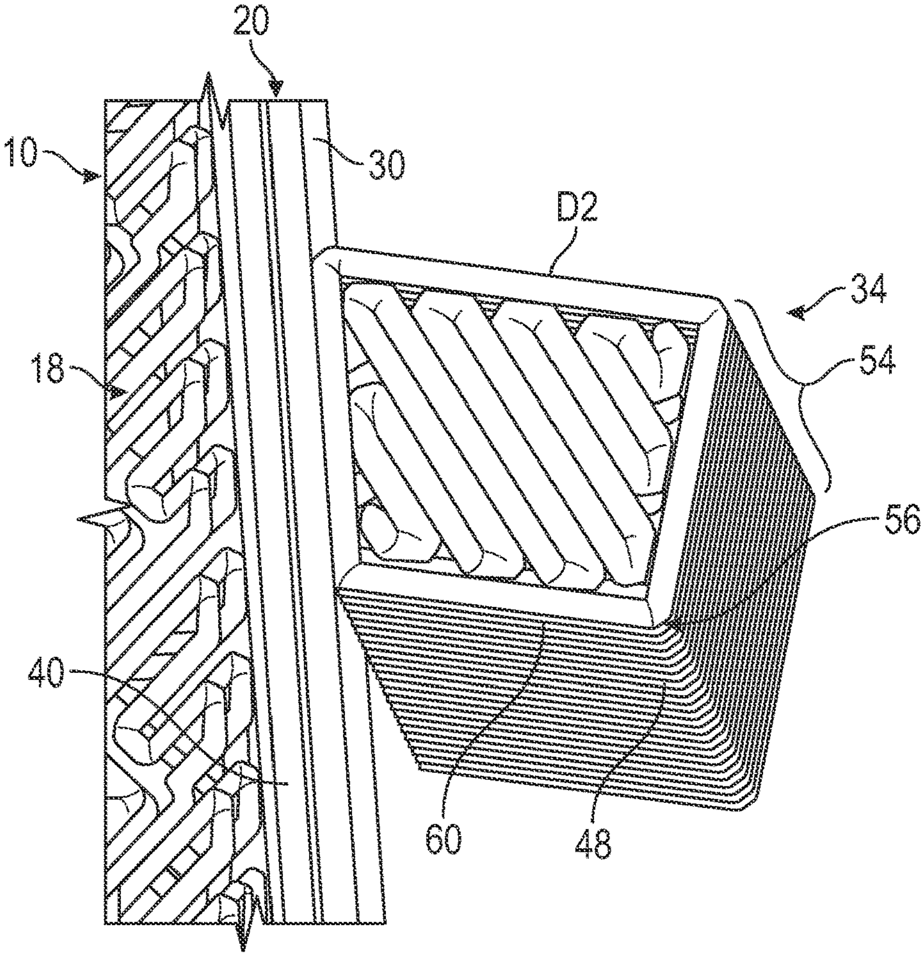
FIG. 3 is a perspective view of the anchor stanchion and the side surface of the FDM additively manufactured part of FIG. 2 after adding another stanchion layer, in accordance with a non-limiting example.

In a non-limiting example illustrated in FIGS. 2 and 3, FDM AM part portion 18 is formed from a plurality of part layers 40. Each of the plurality of part layers 40 includes a part layer diameter D1. The plurality of part layers 40 may be formed from a variety of materials depending on the use of FDM AM part portion 18. The second stanchion portion 34 is formed from a plurality of stanchion layers 48. Each of the plurality of stanchion layers 48 includes a stanchion layer diameter D2. In a non-limiting example, D1 and D2 may be substantially equal. The plurality of part layers 40 may be formed from the same material used to form the plurality of stanchion layers 48.

Figure 4:
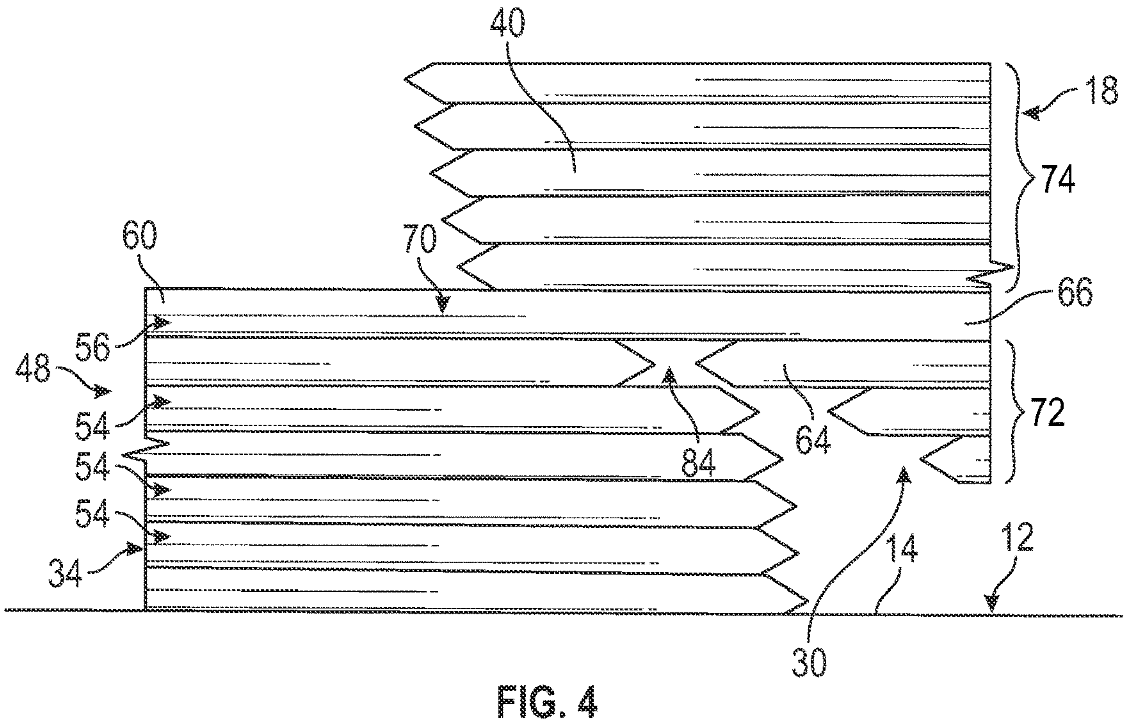
FIG. 4 is a side view of the anchor stanchion and the side surface of the FDM additively manufactured part of FIG. 3, in accordance with a non-limiting example.
Figure 5:
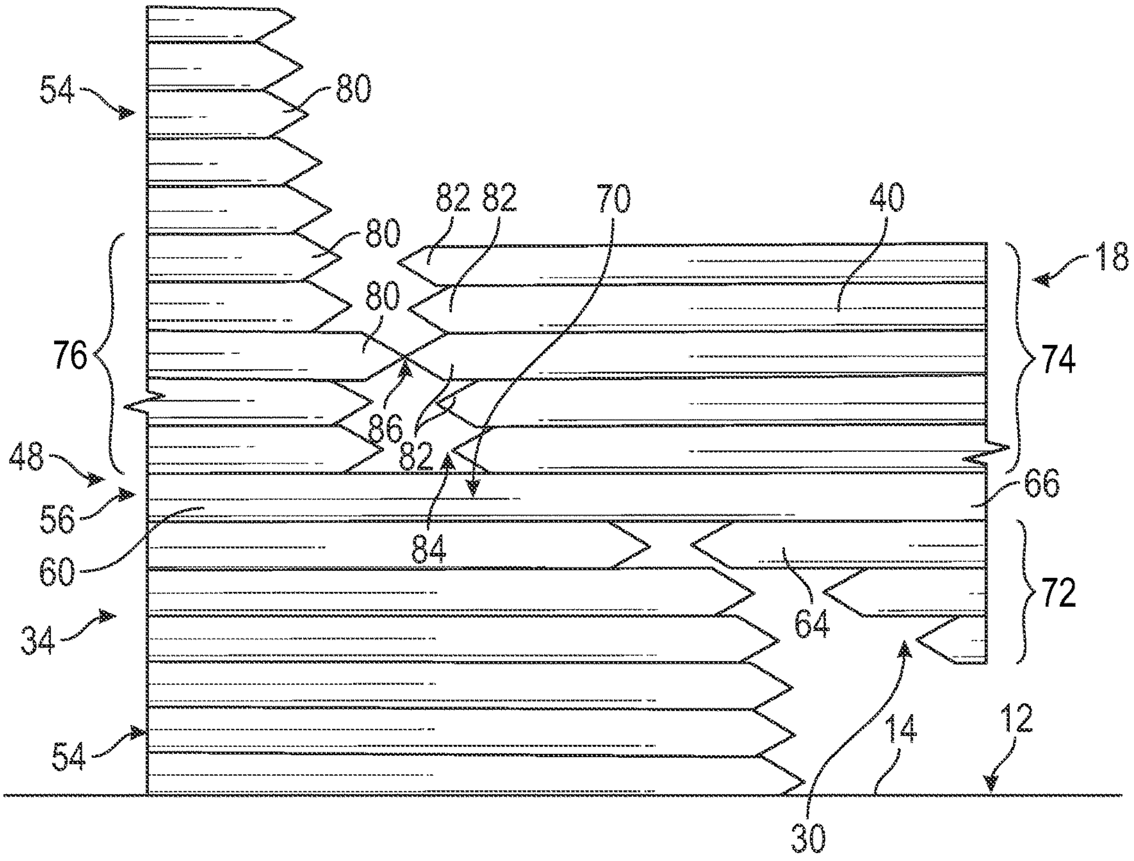
FIG. 5 is a side view of the anchor stanchion and the side surface of the FDM additively manufactured part after adding additional part layers, in accordance with a non-limiting example.

Reference will now follow to FIGS. 4 and 5 with continued reference to FIGS. 2 and 3 in describing second stanchion portion 34 in accordance with a non-limiting example. The plurality of stanchion layers 48 include a first portion or segment 54 that is independent of FDM AM part portion 18 and a second portion 56 that is shared with FDM AM part portion 18. In a non-limiting example, second portion 56 of the plurality of stanchion layers 48 is defined by a single layer 60 of the plurality of stanchion layers 48. Single layer 60 overlaps onto, (e.g., is placed on top of), a first part layer 64 of the plurality of part layers 40 and forms a portion of a second part layer 66 of the plurality of part layers 40. That is, in a non-limiting example, single layer 60 and second part layer 66 form a continuous shared layer 70 that is shared by second stanchion portion 34 and FDM AM part portion 18.

In the non-limiting example shown in FIG. 5, a first plurality 72 of the plurality of part layers 40 is arranged between support substrate 12 and continuous layer 70 and a second plurality 74 of the plurality of part layers 40 is arranged on top of second part layer 66 of the plurality of part layers 40, (e.g., continuous layer 70). Further, a plurality of layers 76 of the first portion 54 of the plurality of stanchion layers 48 is horizontally aligned with and spaced from a corresponding plurality of the second plurality 74 of the plurality of part layers 40.

In a non-limiting example, the plurality of layers 76 of the first portion 54 of the plurality of stanchion layers 48 includes an outer tapered surface 80 and the second plurality 74 of the plurality of part layers 40 includes an outer tapered surface portion 82. In a non-limiting example, outer tapered surface 80 of several of the first portion 54 of the plurality of stanchion layers 48 spaced from the outer tapered surface portion 82 of the second plurality 74 of the plurality of part layers 40 forming a discontinuity or gap 84. The number and location of gaps 84 may vary depending upon a desired frangibility of the connection between second stanchion portion 34 and side surface 30.

In a non-limiting example, outer tapered surface 80 of one of the first portion 54 of the plurality of stanchion layers 48 is joined with the outer tapered surface portion 82 of the second plurality 74 of the plurality of part layers 40 forming an interface 86. Interface 86 includes a diameter that is less than the diameter D1 of the plurality of part layers 40 and the diameter D2 of the plurality of stanchion layers 48. With this arrangement, the discontinuity or gap 84, continuous layer 70, and interface 86 form a frangible connection that allows second stanchion 34 to be readily separated from side surface 30 of FDM AM part portion 18.

Figure 6:
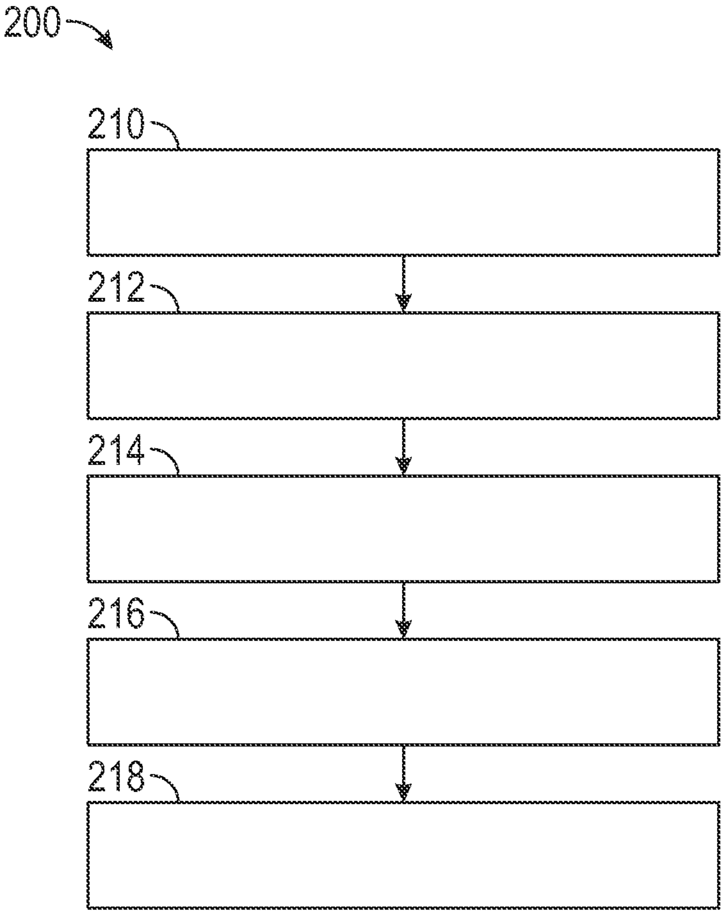
FIG. 6 is a flow chart illustrating a method of forming the FDM additively manufactured part, in accordance with a non-limiting example.

Reference will now follow to FIG. 6 in describing a method 200 of forming FDM AM part system 10 in accordance with a non-limiting example. In block 210 first portion 54 of the plurality of stanchion layers 48 is deposited onto support substrate 12. In block 212 the plurality of part layers 40 is formed adjacent to the first portion 54 of the plurality of stanchion layers 48. In block 214 second portion 56 of the plurality of stanchion layers 48, is formed on the first portion 54 of the plurality of stanchion layers 48. At least one of the second portion 56 of the plurality of stanchion layers 48, (e.g., continuous shared layer 70), overlaps one of the plurality of part layers 40 forming continuous layer 70.

In block 216 second plurality 74 of the plurality of part layers 40 and the plurality of layers 76 of the first portion 54 of the plurality of stanchion layers 48 are formed on continuous layer 70. In block 218 an interface is formed between the outer tapered surface 80 of the first portion 54 of the plurality of stanchion layers 48 and the outer tapered surface portion 82 of the one or more of the second plurality 74 of the plurality of part layers 40 creating a frangible connection. With this arrangement, the discontinuity or gap 84 described herein together with continuous layer 70 and interface 86 form a frangible connection that allows second stanchion 34 to be readily and easily separated from side surface 30 of FDM AM part portion 18 without damaging any part surfaces.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

The term "about" is intended to include the degree of error associated with measurement of the particular quantity based upon the equipment available at the time of filing the application. For example, "about" can include a range of +8% of a given value.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A fused deposition modeling (FDM) additively manufactured part system comprising:

a support substrate;

a part portion arranged at the support substrate, the part portion including a plurality of part layers having a part layer diameter, the part portion including a downwardly facing surface and a side surface; and a stanchion portion including a plurality of stanchion layers having a stanchion layer diameter supporting the part portion relative to the support substrate, the stanchion portion being frangibly connected to the side surface of the part portion, wherein a first portion of the plurality of stanchion layers solely form a segment of the stanchion portion and a second portion of the plurality of stanchion layers overlap onto a first part layer of the plurality of part layers forming the side surface.

2. The FDM additively manufactured part system according to claim 1, wherein the second portion of the plurality of stanchion layers comprises a single one of the second portion of the plurality of stanchion layers.

3. The FDM additively manufactured part system according to claim 2, wherein the single one of the second portion of the plurality of stanchion layers is horizontally aligned with a second part layer of the plurality of part layers.

4. The FDM additively manufactured part system according to claim 3, wherein the single one of the second portion of the plurality of stanchion layers that overlaps onto the first part layer of the plurality of part layers and the second part layer of the plurality of part layers form a continuous shared layer.

5. The FDM additively manufactured part system according to claim 3, wherein a first plurality of the plurality of part layers is arranged between the support substrate and the single one of the second portion of the plurality of stanchion layers.

6. The FDM additively manufactured part system according to claim 4, wherein a second plurality of the plurality of part layers is arranged on the second part layer of the plurality of part layers.

7. The FDM additively manufactured part system according to claim 6, wherein a plurality of the first portion of the plurality of stanchion layers is horizontally aligned with and spaced from a corresponding plurality of the second plurality of the plurality of part layers.

8. The FDM additively manufactured part system according to claim 7, wherein the plurality of the first portion of the plurality of stanchion layers includes an outer tapered surface and the second plurality of the plurality of part layers includes a tapered surface portion.

9. The FDM additively manufactured part system according to claim 8, wherein the outer tapered surface of one of the first portion of the plurality of stanchion layers is horizontally spaced from the tapered surface portion of one of the second plurality of the plurality of part layers.

10. The FDM additively manufactured part system according to claim 8, wherein the outer tapered surface of one of the first portion of the plurality of stanchion layers and the tapered surface portion of one of the second plurality of the plurality of part layers form an interface having a diameter that is less than the stanchion layer diameter and the part layer diameter.

11. A method of forming the FDM additively manufactured part system according to claim 1, the method comprising:

depositing the first portion of the plurality of stanchion layers onto the support substrate;

forming the plurality of part layers adjacent to the first portion of the plurality of stanchion layers; and forming the second portion of the plurality of stanchion layers on the first portion of the plurality of stanchion layers, at least one of the second portion of the plurality of stanchion layers overlapping one of the plurality of part layers.

12. The method of claim 11, wherein forming the second portion of the plurality of stanchion layers includes overlapping a single one of the second portion of the plurality of stanchion layers onto the one of the plurality of part layers.

13. The method of claim 12, wherein overlapping the single one of the second portion of the plurality of stanchion layers includes horizontally aligning the single one of the second portion of the plurality of stanchion layers with one of the plurality of part layers.

14. The method of claim 13, wherein horizontally aligning the single one of the second portion of the plurality of stanchion layers with one of the plurality of part layers includes forming a continuous layer that is shared by the plurality of stanchion layers and the plurality of part layers.

15. The method of claim 14, further comprising forming additional ones of the plurality of part layers on the continuous layer.

16. The method of claim 15, further comprising depositing additional ones of the first portion of the plurality of stanchion layers on the continuous layer.

17. The method of claim 16, wherein depositing the additional ones of the first portion of the plurality of stanchion layers includes horizontally aligning the additional ones of the first portion of the plurality of stanchion layers with the additional ones of the plurality of part layers.

18. The method of claim 17, wherein horizontally aligning the additional ones of the first portion of the plurality of stanchion layers with the additional ones of the plurality of part layers includes maintaining a gap between the additional ones of the first portion of the plurality of stanchion layers and the additional ones of the plurality of part layers.

19. The method of claim 13, wherein horizontally aligning the single one of the second portion of the plurality of stanchion layers with one of the plurality of part layers includes forming a bond between the single one of the second portion of the plurality of stanchion layers and the one of the plurality of part layers.

20. The method of claim 19, wherein forming the bond includes creating a connection having a diameter that is less than a diameter of the single one of the second portion of the plurality of stanchion layers and the one of the plurality of part layers.

* * * * *